United States Patent [19]

Fawkes

[11] 3,750,694
[45] Aug. 7, 1973

[54] VALVE OPERATOR
[75] Inventor: Donald G. Fawkes, Aurora, Ill.
[73] Assignee: Henry Pratt Company, Aurora, Ill.
[22] Filed: Aug. 9, 1971
[21] Appl. No.: 170,236

[52] U.S. Cl............. 137/236, 251/26, 251/31, 251/58
[51] Int. Cl............................. F16k 31/143
[58] Field of Search .......... 92/77; 251/26, 31, 251/25, 58; 137/236

[56] References Cited
UNITED STATES PATENTS

| | | | |
|---|---|---|---|
| 2,028,766 | 1/1936 | Ernst et al. | 91/421 X |
| 2,738,945 | 3/1956 | Shafer | 251/31 X |
| 3,099,287 | 7/1963 | Manor | 251/26 X |
| 3,379,404 | 4/1968 | Anderson | 251/26 |
| 3,452,961 | 7/1969 | Forsman | 251/31 |
| 3,604,679 | 9/1971 | Pennington | 251/26 |

Primary Examiner—Arnold Rosenthal
Attorney—Axel A. Hofgren et al.

[57] ABSTRACT

A seepage-resistant valve system employing a pressure operated valve operator. A selectively operated valve position control system may apply gas to a piston in a cylinder associated with a housing to move the same to control valve position. The housing is in fluid communication with the cylinder and a back pressure valve is employed so that a positive gas pressure is maintained in both the cylinder and the housing regardless of the position of piston within the cylinder to preclude seepage of ground water into the valve operator.

6 Claims, 3 Drawing Figures

Inventor:
Donald G. Fawkes
By Hofgren, Wegner,
Allen, Stellman & McCord
Attys

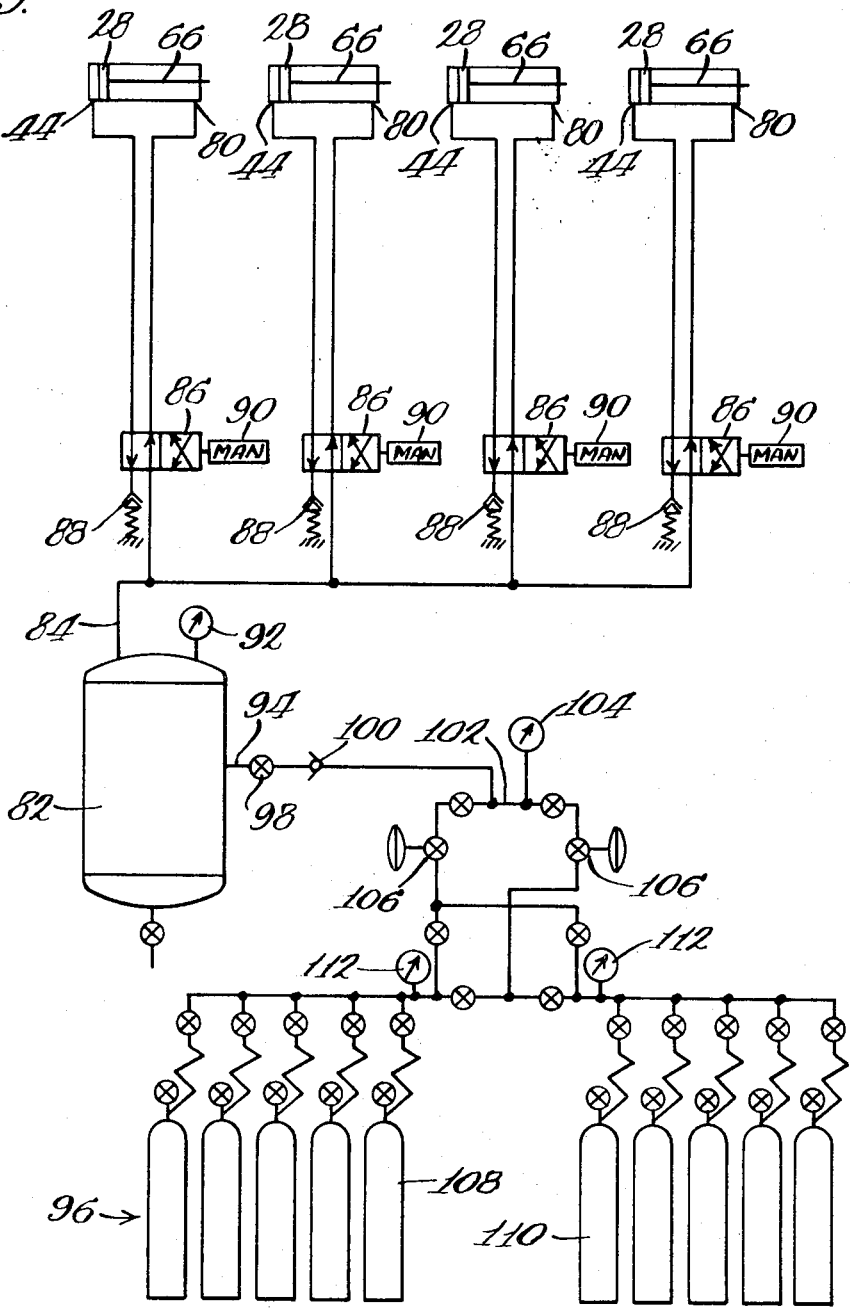

VALVE OPERATOR

BACKGROUND OF THE INVENTION

This invention relates to buried valve operators and systems employing the same.

A large variety of liquid distribution systems, as for example, water distribution systems, employ relatively large valves, customarily butterfly valves, which are buried below a frost line and often it is desirable to provide a powered valve actuator for such valves which customarily is mounted on a valve casing and buried along with the valve.

Frequently in the past, such powered valve operators employ electric motors which, through any of a variety of mechanical linkages, are coupled to the valve so that when energized, the valve position may be changed. Since such valve operators are buried along with the valve, they are susceptible to being disabled by water seepage of ground water. For example, over long periods of time, it may be difficult to preclude the entry of moisture into a housing for an electric motor comprising a portion of a valve operator.

Even when non-electric types of motors are used in conjunction with powered valve operators, such moisture seepage may cause corrosion thereby resulting in binding in the valve operator.

The art has attempted to solve these difficulties through the use of varying types of seals or, in some instances, packing an operator housing with grease. Seals are not totally effective for, as mentioned earlier, after long periods of time, moisture tends to evade such seals and enter the operator housing. Grease, while effective for precluding the entry of moisture into an operating housing, serves no other function other than to provide a moisture barrier.

SUMMARY OF THE INVENTION

It is the principal object of the invention to provide a new and improved valve operator and system employing the same which is not susceptible to deterioration due to seepage of ground water into the valve operator. More specifically, it is an object of the invention to provide such a valve and system employing the same wherein the interior of the valve operator is maintained at a positive pressure by a gas, such as nitrogen, which gas is also employed as a source of energy in conjunction with a reciprocable fluid motor for changing of the valve position.

The exemplary embodiment of the invention achieves the foregoing objects by means of a construction employing a housing journalling a shaft that is adapted to be connected to a valve and having a crank arm within the housing. A cylinder is in fluid communication with the housing and mounts a piston for reciprocating movement therein and the piston is connected by a connecting rod to the crank so that movement of the piston within the cylinder will ultimately rotate the shaft to control the position of the valve secured thereto. A gas port is provided on one end of the cylinder for admitting gas under pressure to drive the piston one direction or for relief of gas when the piston is being driven in the opposite direction. A gas port is also provided in the housing for admitting gas under pressure to drive the piston in a direction oppositely of that mentioned in the preceding sentence or for relieving gas from the cylinder and the housing when the piston is being driven as mentioned preceding.

A source of gas under pressure is also employed in conjunction with a back pressure relief valve and a control valve such as a four-way valve. In one position of the control valve, one side of the piston is connected to the source while the other side is connected to exhaust through the back prssure relief valve. In the other position of the control valve, the foregoing arrangement is reversed.

As a result, one side of the piston will be subjected to gas at a pressure equal to that of the source while the other will be subjected to gas at a pressure equal to approximately that necessary to sustain the back pressure relief valve in an open condition. Thus, a positive pressure will be present on the side of the piston with which the back pressure valve is in communication at any given time so that the entire housing and cylinder are pressurized to preclude seepage of ground water therein through seals thereby eliminating any possibility of corrosion due to moisture seepage.

According to the preferred embodiment, the cylinder is further constructed with stop means at each end thereof for engaging the piston to limit its travel. The length of piston travel is selected in conjunction with the radius of the crank arm on the shaft so that the latter may be rotated about its axis in an amount equal to 90° to ideally suit the valve operator for use with butterfly valves. In addition, an adjustable connection is established between the connecting rod and the crank arm so that the shaft position may be precisely related to the piston position upon initial installation.

The valve and valve operator are extremely well suited for use in multiple valve systems as may be employed, for example, in automatic sprinkler systems and may be arranged with the control valves all at a single location whereby the valves may individually be operated from a remote location.

Other objects and advantages will become apparent from the following specification taken in conjunction with the accompanying drawings.

DESCRIPTION OF THE DRAWINGS

FIG. 3 illustrates a system employing a plurality of the valves provided with valve operators made according to the invention.

DESCRIPTION OF THE PREFERRED EMBODIMENT

Figure 1:
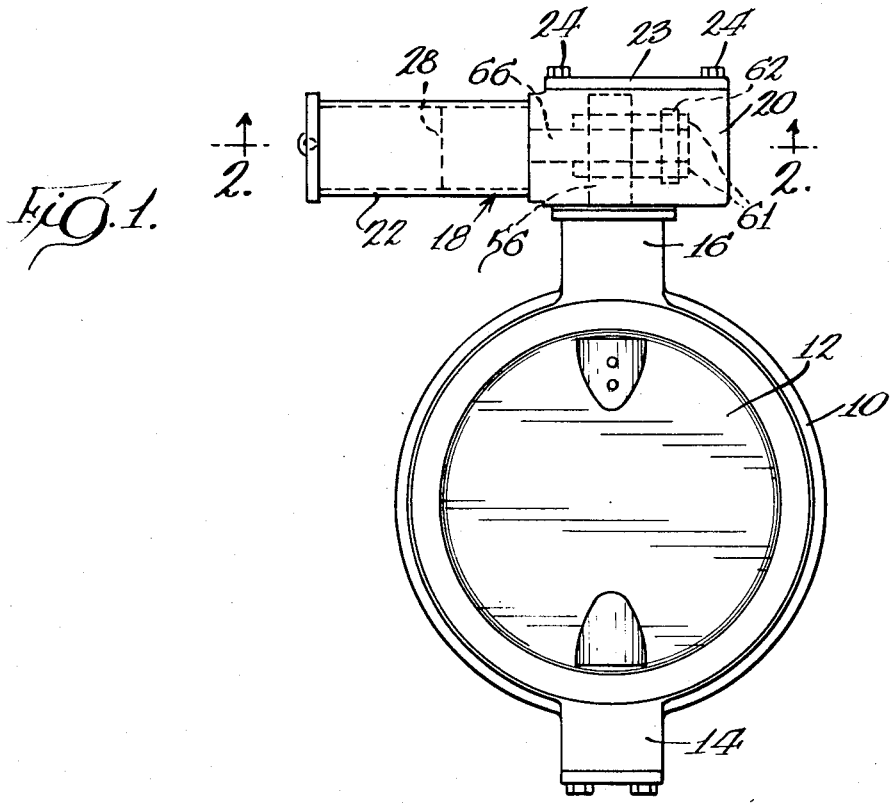
FIG. 1 is a side elevation of a valve and valve operator made according to the invention.
Figure 2:
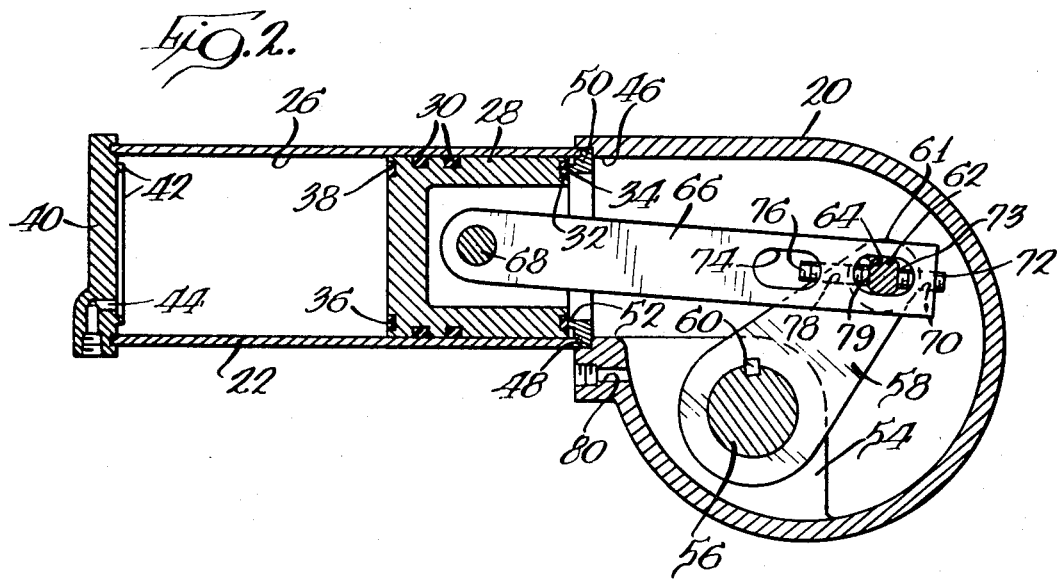
FIG. 2 is a vertical section of the valve operator.

An exemplary embodiment of a valve operator made according to the invention in association with a butterfly valve is illustrated in FIG. 1 while the operator itself is illustrated in FIG. 2. More specifically, there is provided a valve having a casing 10 receiving a valve member 12. The valve member 12 is pivotal about a vertical axis on trunnions received in a lower bearing and seal housing 14 on the casing 10 and an upper bearing and seal housing 16, also on the casing. In addition, the housing 16 may include a spring device (not shown) for automatically rotating the valve member 12 to an open position (90° from the position illustrated at one end) should there be a mechanical failure in the connection between an operator and the valve member 12. Suitable means for this purpose are disclosed in U.S. Pat. No. 3,452,766 to Fenster and assigned to the same assignee as the instant application.

The upper seal and bearing housing 16 has secured thereto a valve operator, generally designated 18 and comprised of a housing 20 and a cylinder 22. Suitable sealing means (not shown) are interposed between seal and bearing housing 16 and the valve operator housing 20 while the upper side of the latter is closed by an access plate 23 secured to the housing by means of bolts 24. In addition, suitable sealing means (not shown) are interposed between the access plate 23 and the housing 20.

Referring now to FIG. 2, the cylinder 22 is seen to include an internal bore 26 receiving a reciprocable piston 28. The piston 28 includes sealing rings 30 extending about its periphery as well as a circular recess 32 at the end of its skirt receiving a ring 34 of resilient material. The face of the piston 28 includes a similar circular groove 36 also receiving a ring 38 of resilient material.

The end of the cylinder 22 opposite the housing 20 is closed by a head 40 having an inwardly projecting stop ring 42 aligned with the resilient material ring 38 on the piston 28. In addition, the head 40 includes a gas port 44 opening interiorly of the ring 42 for the purpose of admitting gas under pressure to the head side of the cylinder 22 to move the piston 28 to the right as illustrated in FIG. 2 and for relieving gas from the bore 26 when the piston 28 is being moved to the left as viewed in FIG. 2. The head 40 may be secured to the cylinder 22 and sealed thereagainst by any suitable means known in the art.

The other end of the cylinder end 22 is received in an open end 46 of the housing 20, and more particularly, in a stepped groove 48 therein. Also within the groove 48 is a ring-shaped insert 50 having an inwardly projecting stop ring 52 aligned with the resilient material ring 34 on the end of the skirt of the piston 28. A suitable seal (not shown) is interposed at the just-described interface and the cylinder 22, the housing 20 and the insert 50 secured in assembled relation as illustrated in FIG. 2 by any suitable means.

The housing 20 has a partially circular periphery and internally of the same includes an inwardly projecting lug or journal 54 rotatably mounting a shaft 56 which, in turn, may be connected to the valve member 12. Pinned to the shaft 56 and within the housing 20 is a lever arm 58. A key 60 accurately locates the lever arm 58 at a predetermined radial position on the shaft 56.

The end of the lever arm 58 remote from the shaft 56 is bifurcated to define upper and lower arms 61 which mount a pivot pin 62 which in turn is received in an elongated slot 64 in an end of a connecting rod 66. The connecting rod 66 has its leftmost end pivotally connected to the piston 28 as by a pivot pin 68 while its rightmost end receives the pin 62 in an adjustable fashion. O-ring seals (not shown) surround the ends of the pin 68 within the skirt of the piston 28 to prevent fluid from passing from one side of the piston to the other. The extreme right-hand end of the connecting rod 66 includes a threaded bore 70 receiving an adjusting screw 72 which is adapted to bear against a flat 73 on one side of the pin 62. Just to the left of the left-hand extremity of the elongated slot 64 is an elongated slot 74 which provides access to an adjustment screw 76 in a threaded bore 78 within the connecting rod 66, which screw 76 also bears against a flat 79 on the pivot pin 62. The bores 70 and 78 preferably are drilled and tapped in a single operation. By appropriate adjustment of the screws 72 and 76, the relative position of the pivot axis defined by pivot pin 62 along the length of the connecting rod 66 may be selected as desired.

The purpose of the foregoing construction is as follows. As is well-known, normal travel for a butterfly valve 12 between open and closed positions is exactly 90°. By appropriately selecting the length of the path of movement of the piston 28 within the cylinder 22, a stroke may be provided that will be capable of providing exactly 90° of rotative movement of the shaft 56. However, to insure that a valve associated with the shaft 56 will be initially installed at a fully closed or a fully open position without relying on accurate location based on the employment of the key 60 or such other means as may be employed to secure the shaft 56 to a valve, accurate initial installation and adjustment may be obtained through the use of the adjustment screws 72 and 76.

The housing 20 is completed by a gas port 80 through which gas under pressure may be introduced into the interior of the housing 20 for the purpose of driving the piston 28 to the left as illustrated in FIG. 2 or for venting the housing and the right-hand portion of the cylinder 22 when the piston 28 is being moved to the right by reason of gas under pressure being introduced into the port 44.

As illustrated in FIG. 3, to provide a source of energy for the operator 18, a source of gas under pressure is provided. For example, a nitrogen-containing reservoir 82 is illustrated and includes an outlet line 84 which is connected to one port of each of a plurality of four-way control valves 86. A second port of each valve 86 is connected to the housing port 80 while a third port is connected to the head port 44. A fourth port of each valve is connected to a respective back pressure relief valve 88 of the type that will open when a predetermined positive pressure is applied thereto but will remain closed when the predetermined pressure is not exceeded. For purposes of the present invention the opening pressure of the valve 88 should be less than that of the source 82 but sufficiently high that head pressure of ground water will not exceed it.

When a four-way valve 86 is in the position illustrated, gas under pressure will be applied to the connecting rod side of the piston 28 via the housing 20 to move the piston 28 to the left to rotate an associated butterfly valve 90°. It will be recognized that the application of pressure in such a way insures pressurization of the housing 20 as well as that portion of the cylinder 22 in fluid communication therewith which pressurization preclude the seepage of ground moisture into the housing 20 and that portion of the cylinder 22 in fluid communication therewith. The same application of pressure will result in gas being forced from the head side of the piston 28 out of the cylinder 22 to the back pressure relief valve 88 but since the latter will open to relieve pressure only in excess of some predetermined pressure, it will be recognized that even after the piston 28 is moved fully to the left within the cylinder 22 there will be residual gas under pressure on the head side of the piston 28. This residual pressure will similarly prevent the seepage of moisture into the interior of the head end of the cylinder 22.

When the position of the four-way valve is changed as by appropriate manipulation of a manual operator 90, the resulting connection of the head end of the piston 28 to the source 84 will pressurize the head end of the cylinder 22 to prevent such seepage while the back pressure relief valve 88, now being connected to the housing end 20, will again maintain a residual pressure to preclude the ground water seepage thereinto.

As mentioned previously, the reservoir 82 may be connected to a plurality of four-way valves 86 which serve as control valves in a system. For example, in a fire protection system wherein a plurality of butterfly valves are employed at remote locations, all of the control valves 86 may be positioned at a single location for ease of operation.

In some instances it is desirable that the system include a number of safety features, etc. To this end, the reservoir 82 is provided with a pressure indicator 92 so that the main pressure within the system may be monitored. In addition, the reservoir 82 is provided with an inlet on a line 94 from a reserve gas reservoir, generally designated 96. The line 94 includes a control valve 98 as well as a check valve 100 and is connected to a header line 102 also including a pressure indicator 104 which may indicate the degree of exhaustion of the reserve source 96. The header line 102 is connected through the valves indicated and to pressure regulating valves 106 to first and second banks 108 and 110 of the reserve source 96 and each bank 108 and 110 is also provided with an associated pressure indicator 112. With the piping and valving system indicated in FIG. 3, either one of the banks 108 or 110 may be disconnected from the line or the total reserve source 96 may be disconnected from the line through use of the valve 98. In addition, should one of the pressure regulators 106 malfunction, either or both banks 108 and 110 may be routed through the pressure regulator 106 that remains functioning while the other is repaired by appropriate manipulation of the indicated valves.

Thus, there is provided a valve operator and system employing the same wherein any one of a plurality of remotely located valves may be controlled from a single location and wherein each valve operator is protected against seepage of ground water that might render the same inoperative. Moreover, a unique reserve system is provided for backup purposes and is constructed so that parts of the same are independent in operation and may be worked on for maintenance purposes without removing the presence of reserve capability.

I claim:

1. A valve operator for use in a seepage-resistant valve system comprising: a housing journaling a shaft for connection to a valve member; a crank arm secured to said shaft within said housing; a cylinder secured to said housing and in fluid communication with the same; a piston within said cylinder; a connecting rod connected to said piston and to said crank arm; means defining a gas port in the end of said cylinder remote from said housing; and means defining a second gas port in one of the other end of said cylinder and said housing whereby a gaseous atmosphere under elevated pressure may be maintained in said housing and said cylinder to preclude seepage of liquid thereinto and whereby gas under pressure may be selectively applied to said piston to cause the same to rotate said shaft to thereby position a valve secured thereto; a valve casing and a valve member rotatably journaled in said casing for movement between open and closed positions, means coupling said valve member to said shaft; a source of gas under pressure; a pair of gas conduits, each having one end connected to a respective one of said gas ports and their opposite ends connected to a four-way valve; a back pressure valve connected to said four-way valve and vented to atmosphere and means connecting said source to said four-way valve.

2. A seepage-resistant power operated valve system comprising: a buried valve casing connected in an underground fluid distribution system; a valve member mounted within said casing for movement between open and closed positions; a buried valve operator operatively associated with said valve member for moving the same between said open and closed positions, said valve operator including a fluid-actuated bidirectional fluid motor, and a housing containing said motor; a source of gas under pressure separate from said fluid distribution system; first means for connecting said source to said housing for directing gas under pressure to drive said fluid motor in one direction and for relieving said fluid motor when said motor is driven in the other direction; second means for connecting said source to said housing for providing gas under pressure to drive said motor in said other direction and for relieving said motor when said motor is driven in said one direction; and means associated with said first and second means for establishing a positive back pressure when either said first or said second means is relieving said motor whereby said housing is continuously maintained at a positive pressure to preclude seepage of moisture thereinto.

3. The system of claim 2 wherein said bidirectional fluid motor comprises a double acting cylinder having a reciprocal piston.

4. The system of claim 2 wherein said last-named means comprises a single means alternately connectible to said first and second means.

5. The system of claim 4 further including a selectively operable valve for alternately connecting
 a. said first means to said source and said second means to said single means, and
 b. said second means to said source and said first means to said single means.

6. The valve system of claim 2 wherein said source of gas under pressure comprises a principal source of gas under pressure, and further including a reserve source of gas under pressure connected to said principal source, and indicator means for indicating when said reserve source is at a predetermined point of exhaustion.

* * * * *